United States Patent
Leathers

(10) Patent No.: US 7,412,840 B2
(45) Date of Patent: Aug. 19, 2008

(54) AIRCRAFT GROUND SUPPORT CART WITH COMPONENT LIFE OPTIMIZATION CONTROL

(75) Inventor: Thomas M. Leathers, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 431 days.

(21) Appl. No.: 11/076,153

(22) Filed: Mar. 8, 2005

(65) Prior Publication Data

US 2006/0201173 A1  Sep. 14, 2006

(51) Int. Cl.
*F25D 15/00* (2006.01)

(52) U.S. Cl. .............................. 62/208; 62/236; 62/237

(58) Field of Classification Search .................. 62/186, 62/236, 86, 79, 172, 237, 208–209, 211
See application file for complete search history.

(56) References Cited

U.S. PATENT DOCUMENTS

| | | | |
|---|---|---|---|
| 2,161,312 A * | 6/1939 | Pritchard ...................... 62/115 |
| 2,165,831 A | 7/1939 | Aulsebrook |
| 2,190,242 A | 2/1940 | Neiman |
| 2,557,099 A | 6/1951 | Green |
| 2,618,470 A | 11/1952 | Brown et al. |
| 2,767,561 A | 10/1956 | Seeger |
| 2,769,320 A | 11/1956 | Kuhlenschmidt et al. |
| 2,870,964 A | 1/1959 | Lindbom |
| 3,139,020 A | 6/1964 | Schemeauer |
| 3,878,692 A | 4/1975 | Steves |
| 4,261,416 A | 4/1981 | Hamamoto |
| 4,263,786 A * | 4/1981 | Eng .............................. 62/87 |
| 4,312,191 A | 1/1982 | Biagini |
| 4,445,342 A | 5/1984 | Warner |
| 4,531,573 A | 7/1985 | Clark et al. |
| 4,632,019 A | 12/1986 | Whiteman |
| 4,655,049 A * | 4/1987 | Andrews et al. ............... 62/172 |
| 4,684,081 A * | 8/1987 | Cronin ......................... 244/58 |
| 4,771,612 A | 9/1988 | Kurikka |
| 4,963,174 A | 10/1990 | Payne |
| 5,086,622 A * | 2/1992 | Warner .......................... 62/88 |
| 5,121,610 A | 6/1992 | Atkinson et al. |
| 5,197,112 A | 3/1993 | Cameron |
| 5,214,935 A * | 6/1993 | Brunskill ...................... 62/402 |
| 5,408,838 A | 4/1995 | Yaeger et al. |
| 5,704,218 A | 1/1998 | Christians et al. |
| 5,709,103 A | 1/1998 | Williams |
| 5,899,085 A * | 5/1999 | Williams ...................... 62/236 |
| 5,934,083 A * | 8/1999 | Scherer et al. ................. 62/79 |
| 6,045,444 A | 4/2000 | Zima et al. |

(Continued)

Primary Examiner—William E. Tapolcai
(74) Attorney, Agent, or Firm—Ingrassia, Fisher & Lorenz, P.C.

(57) ABSTRACT

A ground-based system and method of supplying electrical power and temperature-controlled air to an aircraft environmental control system during ground support operations uses a throttle valve to control the flow of compressed air flowing through a heat exchanger. An air conditioner module mounted on a wheeled cart removes heat from the compressed air that is supplied to it from an auxiliary power unit (APU), and supplies cooled compressed air at a desired temperature. The temperature of the cooled compressed air is controlled by selectively positioning a throttle valve, which regulates compressed air flow from the compressed air source. The throttle valve position is controlled in response to one or more ambient meteorological conditions and/or the amount of electrical power being supplied from the system.

7 Claims, 2 Drawing Sheets

U.S. PATENT DOCUMENTS

| | | | |
|---|---|---|---|
| 6,058,715 A * | 5/2000 | Strang et al. | 62/87 |
| 6,189,324 B1 * | 2/2001 | Williams et al. | 62/172 |
| 6,305,462 B1 | 10/2001 | Tsurushima et al. | |
| 6,381,973 B1 * | 5/2002 | Bhatti et al. | 62/172 |
| 6,542,076 B1 | 4/2003 | Joao | |
| 6,637,215 B1 * | 10/2003 | Leathers | 62/87 |
| 6,640,560 B2 | 11/2003 | Rohrbach et al. | |
| 6,662,575 B2 * | 12/2003 | Clarke | 62/87 |
| 6,681,591 B2 * | 1/2004 | Defrancesco et al. | 62/401 |
| 6,776,002 B1 | 8/2004 | Ho | |
| 2003/0066299 A1 * | 4/2003 | Aoki | 62/186 |

\* cited by examiner

AIRCRAFT GROUND SUPPORT CART WITH COMPONENT LIFE OPTIMIZATION CONTROL

TECHNICAL FIELD

The present invention relates to environmental control systems for aircraft and, more particularly, to a ground power cart for efficiently supplying electrical power and temperature-controlled air to an aircraft while it is on the ground.

BACKGROUND

Aircraft main engines not only provide propulsion for the aircraft, but in many instances may also be used to drive various other rotating components such as, for example, generators and pumps. The main engines may also be used to supply compressed air to the aircraft's environmental control system, which may be used to supply temperature-controlled air to both the aircraft cabin and to electronic equipment within the aircraft.

When an aircraft is on the ground and its main engines are not being used, an alternative power source may be used to supply electrical power to onboard electrical equipment, such as the aircraft avionics suite. In addition, during some ground support operations, an external supply of cooling or heating air may be used to supply temperature-controlled air to the cabin and the onboard aircraft electrical equipment. For some type of aircraft ground support applications, most notably military aircraft ground support applications, a ground power cart may be used to supply electrical power and temperature-controlled air to the onboard electronic equipment and the aircraft cabin.

One particular ground power cart that may be used during aircraft ground support operations includes an auxiliary power unit (APU) that generates and supplies electrical power to onboard electrical equipment, and supplies high temperature (e.g., $\geqq 300°$ F.) compressed air to an air conditioner module. The air conditioner module conditions the compressed air to a predetermined temperature and supplies the conditioned compressed air to the aircraft. The air conditioner module may be used in at least two modes, a cooling mode, to supply cool air, or a heating mode, to supply warm air. To do so, the air conditioner module may include a primary heat exchanger, a condenser, a moisture separator, and one or more cooling turbines. Typically, this air conditioner module is designed so that when it is operating in the cooling mode it will supply cool air at a specified flow rate and at a predetermined desired temperature for a given, predetermined design ambient temperature and design electrical load. For example, the module may be designed to supply cooling air at 100 lb/min, and at a temperature no higher than 55° F. when the ambient temperature is 125° F. and when a specified maximum electrical load on the aircraft is energized.

When actual ambient temperature is below the design ambient temperature, the air conditioner module may supply cooling air at the 100 lb/min flow rate and at a temperature that is less than 55° F. In some instances, supplying air to an aircraft at a flow rate of 100 lb/min and at a temperature less than 55° F. may not be desirable. In addition, when the actual electrical load being supplied by the APU is below the design electrical load, it may not be needed or desirable, to supply a flow rate of 100 lb/min of cooling air, either above or below 55° F. Nonetheless, current ground power carts are typically configured to supply the full rate of cooling air flow without regard to the ambient temperature or supplied electrical load. Consistently supplying cooling air at such a relatively high flow rate can adversely impact the lifetime of the APU or air conditioner module components. This can also result in increased fuel consumption by the APU.

Hence, there is a need for a system and method of providing temperature-controlled air to an aircraft environmental control system and electrical power to onboard aircraft electrical loads during ground support operations that can increase system component lifetimes, and/or can result in reduced fuel consumption. The present invention addresses one or more of these needs.

BRIEF SUMMARY

The present invention provides an aircraft ground support system for supplying electrical power and temperature-controlled air to an aircraft during ground support operations that is simple, efficient, and does not adversely affect system costs, and/or lifetime, and/or fuel consumption.

In one embodiment, and by way of example only, a support system for supplying electrical power and temperature-controlled air to an aircraft on the ground includes an auxiliary power unit (APU), an air conditioner module, a meteorological sensor, a control circuit, and a throttle valve. The APU is configured to supply a flow of compressed air and to generate electrical power. The air conditioner module is coupled to receive the flow of compressed air from the APU and is configured, upon receipt thereof, to supply a flow of temperature controlled air. The meteorological sensor is configured to sense an ambient meteorological condition and supply a meteorological signal representative thereof. The control circuit is coupled to receive the meteorological signal and is operable, in response thereto, to supply a throttle valve control signal based at least in part on the meteorological signal. The throttle valve is disposed between the APU and the air conditioner module. The throttle valve is coupled to receive the throttle valve control signal and is operable, in response thereto, to selectively move to control compressed air flow rate from the APU to the air conditioner module.

In another exemplary embodiment, a support system for supplying electrical power and temperature-controlled air to an aircraft on the ground includes an auxiliary power unit (APU), an air conditioner module, an electrical sensor, a control circuit, and a throttle valve. The APU is configured to supply a flow of compressed air and to generate electrical power. The air conditioner module is coupled to receive the flow of compressed air from the APU and is configured, upon receipt thereof, to supply a flow of temperature controlled air. The electrical sensor is configured to sense the electrical power generated by the APU and supply an output power signal representative thereof. The control circuit is coupled to receive the output power signal and is operable, in response thereto, to supply a throttle valve control signal based at least in part on the output power signal. The throttle valve is disposed between the APU and the air conditioner module. The throttle valve is coupled to receive the throttle valve control signal and is operable, in response thereto, to selectively move to control compressed air flow rate from the APU to the air conditioner module.

In yet another exemplary embodiment, a support system for supplying electrical power and temperature-controlled air to an aircraft on the ground includes an an auxiliary power unit (APU), an air conditioner module, an ambient temperature sensor, an electrical sensor, a control circuit, and a throttle valve. The APU is configured to supply a flow of compressed air and to generate electrical power. The air conditioner module is coupled to receive the flow of compressed air from the APU and is configured, upon receipt thereof, to supply a flow of temperature controlled air. The ambient temperature sensor is configured to sense ambient environmental temperature and supply an ambient temperature signal representative thereof. The electrical sensor is configured to sense the electrical power generated by the APU and supply an output power signal representative thereof. The control circuit is coupled to receive the ambient temperature signal and the output power signal and is operable, in response thereto, to supply a throttle valve control signal based at least in part on the ambient temperature signal and the output power signal. The throttle valve is disposed between the APU and the air conditioner module. The throttle valve is coupled to receive the throttle valve control signal and is operable, in response thereto, to selectively move to control compressed air flow rate from the APU to the air conditioner module.

In still another exemplary embodiment, a method of conditioning compressed air supplied from an aircraft ground support cart that is positioned in an ambient environment includes supplying a flow of compressed air from an auxiliary power unit (APU) through a first heat flow path in a heat exchanger, and supplying an amount of electrical power from the APU to one or more electrical loads. A flow of primary air is supplied through a second flow path in the heat exchanger to thereby condition the compressed air to a temperature. One or more ambient meteorological conditions of the ambient environment are sensed. The flow of compressed air through the first heat exchanger flow path is throttled, based at least in part on the one or more sensed ambient meteorological conditions, to thereby control the temperature of the conditioned compressed air exiting the heat exchanger.

Other independent features and advantages of the preferred aircraft ground support system will become apparent from the following detailed description, taken in conjunction with the accompanying drawings which illustrate, by way of example, the principles of the invention.

DETAILED DESCRIPTION OF VARIOUS EMBODIMENTS

Figure 1:
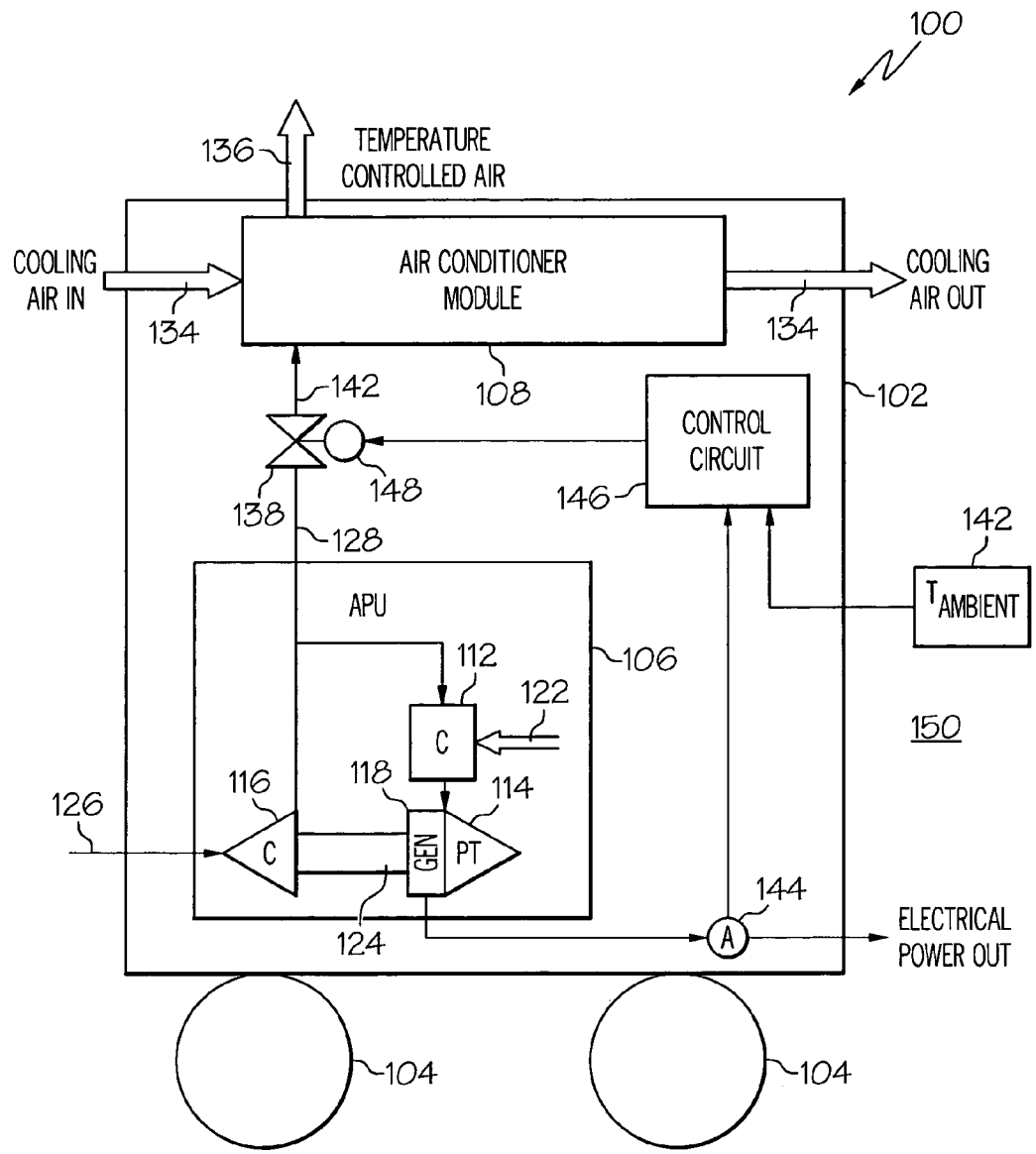
FIG. 1 is a simplified schematic diagram of a ground cart with a modular aircraft ground support air conditioning unit mounted thereon.

A simplified schematic representation of an exemplary ground cart 100 is depicted in FIG. 1. The ground cart 100 includes a housing 102 and varying numbers of rotationally mounted wheels 104, which allow the cart 100 to be readily transported to one or more aircraft. Various systems and components may be mounted on or within the housing 102 to generate electrical power and supply conditioned air for aircraft ground support operations. In the depicted embodiment, the ground cart 102 includes an auxiliary power unit (APU) 106 and an air conditioner module 108. It should be appreciated that other systems and components may also be mounted on or within in the ground cart 100, but for the sake of clarity and ease of description, only a single APU 106 and air conditioner module 108 are depicted.

The general operation and configuration of turbine APUs is well-known in the industry. In the depicted embodiment, the APU 106 includes a combustor 112, a power turbine 114, a compressor 116, and an electrical generator 118. During APU operation, the combustor 112 receives fuel 122 from a fuel source (not illustrated) and supplies high energy air to the power turbine 114 causing it to rotate. The power turbine 114 includes a shaft 124 that is used to drive the compressor 116 and the electrical generator 118.

The compressor 116, upon being rotated, draws in ambient air 126, compresses it, and supplies compressed air 128 to the air conditioner module 108. The electrical generator 118, upon being rotated, supplies electrical power to a load, such as the aircraft avionics suite (not shown). The electrical generator 118 may be implemented as any one of numerous types of electrical generators that, upon rotation, supply either AC electrical power or DC electrical power. However, in the depicted embodiment, the electrical generator 118 is a brushless AC generator.

The air conditioner module 108 receives the compressed air 128 from the APU 106, and primary cooling air 134 from an external source such as, for example, ambient air that is drawn into and through the air conditioner module 108. The air conditioner module 108 is configured, upon receipt of these two air flows, to supply a flow of temperature-controlled air 136 to the environmental control system (ECS) in an aircraft. It will be appreciated that the air conditioner module 108 may implemented using any one of numerous components and in any one of numerous configurations. A more detailed description of a particular preferred embodiment of the air conditioner module 108 and the components that comprise the air conditioner module 108, and its configuration, to implement this function will be provided further below.

As FIG. 1 also shows, a throttle valve 138 is disposed between the APU 106 and the air conditioner module 108. The throttle valve 138, which is mounted on a conduit 142 that fluidly couples the APU compressor 116 and the air conditioner module 108, is selectively moveable between a closed position and an open position, and its position determines the flow rate of the compressed air 128 supplied from the APU 106 to the air conditioner module 108. It will be appreciated that the throttle valve 138 may be any one of numerous known valve designs presently known in the art or developed in the future, but the presently preferred valve 138 is a butterfly valve.

Various control schemes can be used to selectively position the throttle valve 138, including various manual and automatic control schemes. In the depicted embodiment, an automatic control scheme is used, and is implemented using one or more meteorological sensors 142, one or more electrical sensors 144, and a control circuit 146. The meteorological sensors 142 are mounted on or near the ground cart 100, and are configured to sense an ambient meteorological condition of the ambient environment 150 in which the cart is positioned. In a particular preferred embodiment, a single temperature sensor 142 is used to sense ambient temperature and to provide an ambient temperature signal representative thereof, though multiple temperature sensors 142 could also be used. It will be appreciated that the temperature sensor 142 may be any one of numerous sensors including, but not limited to, a capillary bulb temperature sensor, a resistance temperature detector (RTD), a thermocouple, or an optical temperature sensor. It will additionally be appreciated that various other types and numbers of meteorological sensors 142 in addition to or instead of the temperature sensor 142 could be used. For example, one or more relative humidity sensors and/or one or more barometric pressure sensors could also (or instead) be used.

The electrical sensors 144 are also preferably mounted on or near the ground cart 100, and are configured to sense the amount of electrical power being supplied by the APU generator 118 to electrical loads, such as aircraft avionics equipment, in the aircraft. It will be appreciated that the electrical sensors 144 may be any one of numerous types and numbers of sensors including, but not limited to, current sensors, voltage sensors, and power sensors. In the depicted embodiment, only a single current sensor 144 is used. However, it will be appreciated that multiple sensors 144 (current, voltage, and/or power) could be used to sense electrical power generation.

No matter the specific type or number of sensors that are used, each meteorological sensor 142 supplies a signal to the control circuit 146 that is representative of the sensed ambient meteorological condition, and each electrical sensor 144 supplies a signal to the control circuit 146 that is representative of the sensed electrical power the APU generator 118 is supplying to aircraft electrical loads. In response, the control circuit 144 processes the received signals and supplies an appropriate valve control signal to a valve actuator 148 that is coupled to the throttle valve 138. The valve control signal, when supplied by the control circuit 146, causes the throttle valve actuator 148 to position the throttle valve 138 to a desired position. It will be appreciated that the throttle valve actuator 148 may be any one of numerous types of actuators including, but not limited to, pneumatic, hydraulic, and electrical.

The temperature of the temperature-controlled air 136 supplied from the air conditioner module 108 is controlled, at least in part, by the rate of flow of the compressed air 128 supplied from the APU 106 to the air conditioner module 108. The rate of flow of the compressed air 128 supplied from the APU 106 is controlled by the position of the throttle valve 138, which is in turn controlled based on the sensed ambient meteorological condition (or conditions) and the electrical power supplied by the APU generator 118 to an aircraft on the ground. Thus, the temperature of the temperature-controlled air 136 supplied to the aircraft on the ground is controlled based on the sensed ambient meteorological condition (or conditions) and the electrical power supplied from the APU generator 118 to the aircraft.

Having generally described the ground cart 100 and its operation, and the APU 106 in slightly more detail, for completeness a detailed description of a particular embodiment of the air conditioner module 108 will now be provided. In doing so, reference should be made to FIG. 2, in which it is shown that the air conditioner module 108 includes a first heat exchanger 202, a primary air flow passage 204, a bypass flow passage 206, a compressed air flow passage 208, second heat exchanger 210, a moisture separator 212, and a cooling turbine 214.

The first heat exchanger 202 includes at least two fluid flow paths, a first fluid flow path 201 and a second fluid flow path 203. The first fluid flow path 201 is fluidly coupled in series in the primary air flow passage 204, and the second fluid flow path 203 is fluidly coupled to receive the compressed air 128 supplied from the APU 106. More specifically, the primary air flow passage 204 receives the flow of primary cooling air 134, via an inlet port 216, and exhausts a flow of warmed primary cooling air 134, via an outlet port 218. The bypass flow passage 206 is fluidly coupled in parallel with the primary air flow passage 204. Thus, in the depicted embodiment, the bypass flow passage 206 includes an inlet port 222 in fluid communication with the primary air flow passage inlet port 216, and an outlet port 224 in fluid communication with the primary air flow passage outlet port 218. It will be appreciated that this configuration is only exemplary of a particular preferred embodiment, and that various other configurations can be used, including the one depicted in phantom in FIG. 2, in which an alternative bypass flow passage inlet 223 is in fluid communication with the source of the primary cooling air 134 may be used.

A bypass valve 226 is mounted on the bypass flow passage 206. The bypass valve 226 may be any one of numerous known valve designs presently known in the art, or developed in the future, but the presently preferred valve design is a butterfly valve. The bypass valve 226 is selectively moveable between a closed and an open position, and its position determines the flow rate of primary cooling air 134 through the first heat exchanger 202. More particularly, if the bypass valve 226 is fully closed, substantially all of the primary cooling air 134 drawn into the air conditioner module 108 flows through the first heat exchanger first flow path 201. As the bypass valve 226 is opened, a fraction of the primary cooling air 134 that is drawn into the air conditioner module 108 flows through the bypass flow passage 206, thereby reducing the primary cooling air flow rate through the first heat exchanger first fluid flow path 201. Thus, the bypass valve 226 may be used to control the flow of primary cooling air 134 through the first heat exchanger first fluid flow path 201.

A fan 228 draws the primary cooling air 134 into the air conditioner module 108, through the primary air flow passage 204 and, if the bypass valve 226 is open, through the bypass flow passage 206. In the depicted embodiment, the fan 228 is positioned within the air conditioner module 108 to "pull" the primary cooling air 134 through the first heat exchanger first fluid flow path 201. It will be appreciated that the fan 228 could also be positioned within the air conditioner module 108 to "push" the primary cooling air 134 through the first heat exchanger first fluid flow path 201. Alternatively, the fan 228 may be eliminated if an outside power source is used to move air through the primary air flow passage 204.

The compressed air flow passage 208 is in fluid communication with the APU compressor 116 (not shown in FIG. 2) via the conduit 142. The compressed air flow passage 208 receives the flow of the compressed air 128 supplied from the APU 106 and directs the compressed air into the first heat exchanger second fluid flow path 203. The position of the throttle valve 138 is controlled to control the flow rate of the compressed air 128 supplied from the APU 106 to the first heat exchanger second fluid flow path 203. As the compressed air 128 flows through the second fluid flow path 203, it is cooled by the primary cooling air 134 flowing through the first heat exchanger first fluid flow path 201. Thus, the first heat exchanger 202 not only receives the primary cooling air 134 and the compressed air 128, it also supplies the warmed primary cooling air 134 and cooled compressed air 234.

The cooled compressed air 234 that exits the first heat exchanger second flow path 203 is directed through the second heat exchanger 210. In the second heat exchanger 210 the cooled compressed air 234 from the first heat exchanger 202 is further cooled by another flow of air. Specifically, air 244 that is exhausted from the cooling turbine 214 also directed through the second heat exchanger 210, and is used to further cool the cooled compressed air 234 from the first heat exchanger 202. The cooling turbine exhaust air 244 that is warmed by the compressed air in the second heat exchanger 210 flows out a temperature-controlled air supply port 246, which supplies the temperature-controlled air 136 to, for example, an aircraft.

The further cooled compressed air 238 flowing out of the second heat exchanger 210 may contain moisture. Therefore, this air is directed through the moisture separator 212. The moisture separator 212 may be any one of numerous devices known now, or provided in the future, for removing moisture from a flowing gas. In a particular preferred embodiment, the moisture separator 212 is the type that removes moisture by centrifugally separating free water droplets from the air flow, and exhausting the free water. Thereafter, the dry, further cooled compressed air 242 that exits the moisture separator 212 is directed into the cooling turbine 214. This air 242 impinges upon rotating blades (not illustrated) in the cooling turbine 214, causing the blades to rotate. As the air impinges on the rotating blades, work is extracted from the air, cooling the air even further. As noted above, the air 244 exhausted from the cooling turbine 214 is then directed through the second heat exchanger 210 where it is warmed and directed out the temperature-controlled air outlet port 246, supplying the temperature-controlled air 136.

The temperature of the air 136 that exits the temperature-controlled air outlet port 246 is determined by the temperature of the cooled compressed air 234 that exits the first heat exchanger 202. In the preferred embodiment, the temperature of the cooled compressed air 234 is controlled by controlling the flow rate of compressed air 128 through the first heat exchanger second flow path 203. As was noted above, this is implemented using the control circuit 146, which is configured to control the compressed air flow rate through the first heat exchanger second flow path 203 by positioning the throttle valve 138 in response to one or more sensed ambient meteorological conditions and/or the sensed electrical power being supplied by the APU generator 118.

Figure 2:
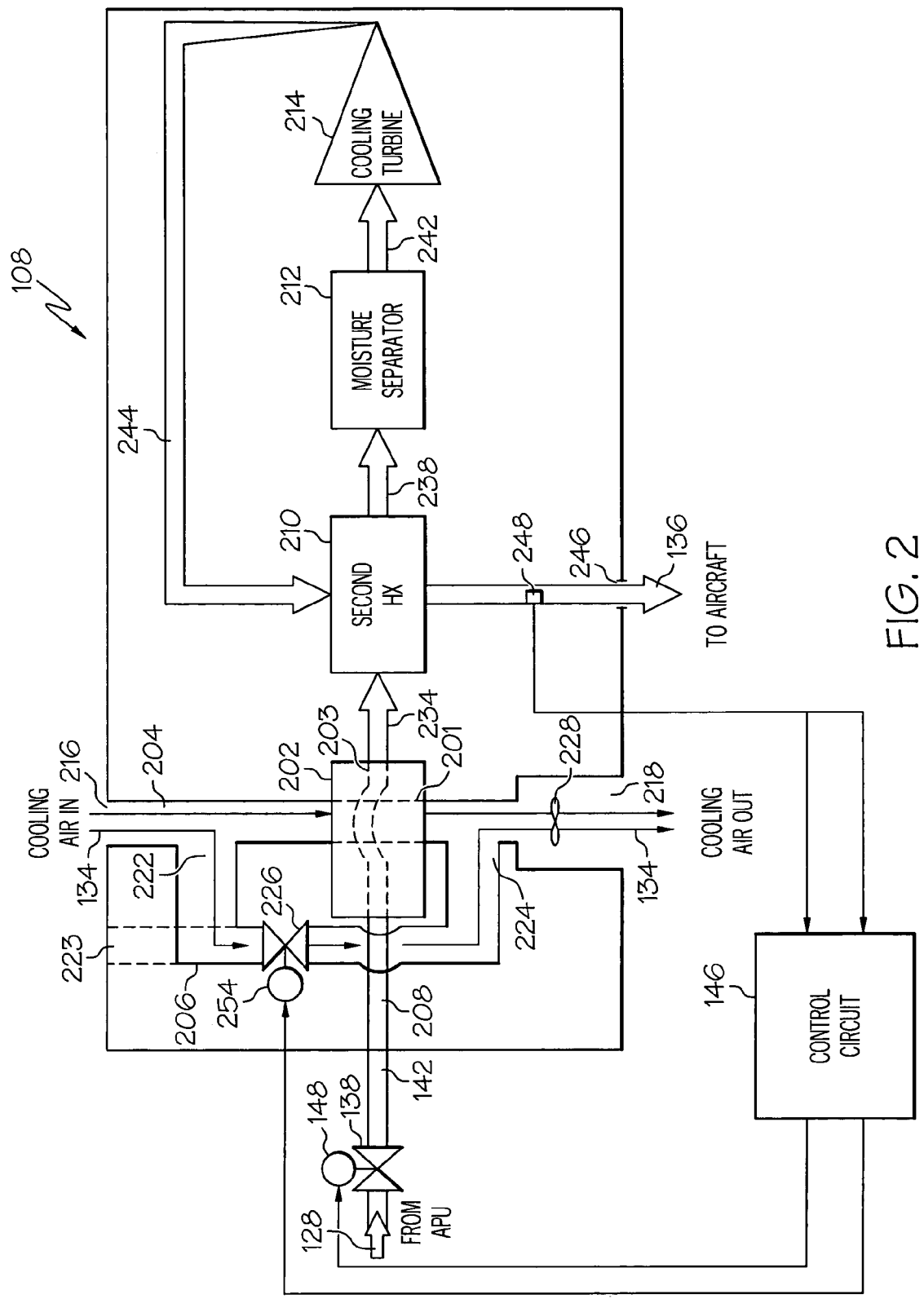
FIG. 2 is a schematic representation of an exemplary embodiment of the air conditioning unit depicted in FIG. 1.

It will be appreciated that in an alternative embodiment, the control circuit 146 may additionally be configured to control the position of the throttle valve 138, and thus compressed air flow rate through the first heat exchanger second flow path 203, in response to the temperature of cooled compressed air 234. This alternative embodiment is illustrated in FIG. 2 and is implemented by positioning one or more discharge temperature sensors 248 in the temperature-controlled air outlet port 246. The discharge temperature sensors 248 may be any one of numerous sensors including, but not limited to, a capillary bulb temperature sensor, a resistance temperature detector (RTD), a thermocouple, or an optical temperature sensor. Each temperature sensor 248 supplies the control circuit 146 a signal that is representative of the temperature of the air 136 discharged from the temperature-controlled air outlet port 246. For simplicity, only a single discharge temperature sensor 248 is shown. However, it will be appreciated that multiple temperature sensors 246 could be used.

It will be appreciated that the position of each discharge temperature sensor 248 is not limited to the temperature-controlled air outlet port 246, but could instead be located in any one of numerous positions downstream of the first heat exchanger second fluid flow path 203. For example, one or more of the discharge temperature sensors 248 could be positioned to directly sense the temperature of the cooled compressed air 234 exiting the first heat exchanger second fluid flow path 203. It will be appreciated that in any one of the numerous positions, the discharge temperature sensors 248 will supply a temperature signal representative of the temperature of the cooled compressed air 234 exiting the first heat exchanger second fluid flow path 203.

The temperature of the cooled compressed air 234 can also be controlled by controlling the flow rate of the primary cooling air 134 through the first heat exchanger first flow path 201. As was noted above, the primary cooling air flow rate through the first heat exchanger first flow path 201 may be controlled by controlling the flow rate of the primary cooling air 134 through the bypass flow passage 206, which may in turn be controlled by positioning the bypass valve 226. Thus, in yet another alternative embodiment, which is also shown in FIG. 2, the control circuit 146 can be configured to control the temperature of the temperature-controlled air 136 exiting the outlet port 246 by controlling the positions of both the throttle valve 138 and the bypass valve 226.

In the depicted alternative embodiment, the control circuit 146 processes the discharge temperature signal and supplies an appropriate bypass valve control signal to a bypass valve operator 254 that is coupled to the bypass valve 226. The control circuit 146 additionally processes the discharge temperature signal, the ambient meteorological signal, and the electrical signal, and supplies an appropriate throttle valve control signal to the valve actuator 148 that is coupled to the throttle valve 138. The bypass valve control signal, when issued by the control circuit 146, causes the bypass valve operator 254 to position the bypass valve 226 to a desired position. Similarly, the throttle valve control signal, when issued by the control circuit 146, causes the throttle valve actuator 148 to position the throttle valve 138. It will be appreciated that although a single control circuit 146 is used to control the throttle valve 138 and the bypass valve 226, separate bypass valve and throttle valve control circuits could also be used.

The ground support system and method implemented by the ground cart 100 allows the flow rate and temperature of the cool air it supplies to be more precisely and more easily controlled. In addition, more precisely controlling the flow rate of compressed air supplied from the APU can reduce the APU load, and potentially extend the time between maintenance and/or overhauls. Thus, maintenance costs can be reduced. Fuel consumption by the APU can also be reduced.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An aircraft ground cart for supplying electrical power and temperature-controlled air to an aircraft on the ground, the ground cart comprising:

an auxiliary power unit (APU) configured to (i) supply a flow of compressed air and (ii) generate electrical power;

an air conditioner module coupled to receive the flow of compressed air from the APU and configured, upon receipt thereof, to supply a flow of temperature controlled air;

a meteorological sensor configured to sense an ambient meteorological condition of an environment in which the ground cart is positioned and supply a meteorological signal representative thereof;

an electrical sensor configured to sense the electrical power generated by the APU and supply an output power signal representative thereof;

a control circuit coupled to receive the meteorological signal and the output power signal and operable, in response thereto, to supply a throttle valve control signal based at least in part on the meteorological signal and the output power signal; and a throttle valve disposed between the APU and the air conditioner module, the throttle valve coupled to receive the throttle valve control signal and operable, in response thereto, to selectively move to control compressed air flow rate from the APU to the air conditioner module.

2. The ground cart of claim 1, wherein the meteorological sensor comprises a temperature sensor configured to sense ambient temperature of the environment in which the ground cart is positioned and supply a signal representative thereof.

3. The ground cart of claim 1, wherein the air conditioner module comprises:
- a primary air flow passage coupled to receive a flow of primary air;
- a compressed air flow passage coupled to receive the flow of compressed air; and
- a first heat exchanger having at least a first fluid flow path and a second fluid flow path, the first fluid flow path fluidly coupled in series in the primary air flow passage, the second fluid flow path fluidly coupled in series in the compressed air flow passage, the first heat exchanger adapted to transfer heat between the primary air and the compressed air and supply at least conditioned compressed air,
- wherein the throttle valve is mounted on the compressed air flow passage.

4. The ground cart of claim 3, further comprising:
- at least one cooling turbine having an air intake port and an air exhaust port;
- a second heat exchanger coupled to receive the conditioned compressed air from the first heat exchanger and turbine exhaust air from the cooling turbine air exhaust port, and adapted to transfer heat from the conditioned compressed air to the cooled air exhausted from the cooling turbine and supply warmed turbine exhaust air and further conditioned compressed air.

5. The ground cart of claim 4, wherein the cooling turbine air intake is coupled to receive the further conditioned compressed air from the second heat exchanger.

6. The ground cart of claim 3, further comprising:
- a fan operable to draw the primary air from a primary air source into the primary air flow passage.

7. A support system for supplying electrical power and temperature-controlled air to an aircraft on the ground, the support system comprising:
- an auxiliary power unit (APU) configured to (i) supply a flow of compressed air and (ii) generate electrical power;
- an air conditioner module coupled to receive the flow of compressed air from the APU and configured, upon receipt thereof, to supply a flow of temperature controlled air;
- an ambient temperature sensor configured to sense ambient temperature of an environment in which the ground cart is positioned and supply an ambient temperature signal representative thereof;
- an electrical sensor configured to sense the electrical power generated by the APU and supply an output power signal representative thereof; and
- a control circuit coupled to receive the ambient temperature signal and the output power signal and operable, in response thereto, to supply a throttle valve control signal based at least in part on the ambient temperature signal and the output power signal; and
- a throttle valve disposed between the APU and the air conditioner module, the throttle valve coupled to receive the throttle valve control signal and operable, in response thereto, to selectively move to control compressed air flow rate from the APU to the air conditioner module.

* * * * *